(12) United States Patent
Samwell et al.

(10) Patent No.: US 6,799,604 B1
(45) Date of Patent: Oct. 5, 2004

(54) SELECTOR VALVE ARRANGEMENT

(75) Inventors: Christopher Samwell, Bushby (GB);
Robert William Bishop, Blaby (GB)

(73) Assignee: NewTeam Limited (GB)

( * ) Notice: Subject to any disclaimer, the term of this patent is extended or adjusted under 35 U.S.C. 154(b) by 200 days.

(21) Appl. No.: 10/070,229

(22) PCT Filed: Jun. 28, 2000

(86) PCT No.: PCT/GB00/02498
§ 371 (c)(1),
(2), (4) Date: Feb. 28, 2002

(87) PCT Pub. No.: WO01/53732
PCT Pub. Date: Jul. 26, 2001

(30) Foreign Application Priority Data

Jan. 19, 2000 (GB) .............................. 0001100

(51) Int. Cl.$^7$ ............................................... F17D 1/00
(52) U.S. Cl. ............. 137/597; 137/614.11; 137/625.11; 137/636.4
(58) Field of Search ........................... 137/597, 614.11, 137/625.11, 636.4, 876

(56) References Cited

U.S. PATENT DOCUMENTS

| 3,520,327 | A | * | 7/1970 | Claydon et al. | |
| 3,780,758 | A | | 12/1973 | De Vries | 137/454.6 |
| 3,840,046 | A | | 10/1974 | Busquets | 137/549 |
| 4,109,670 | A | | 8/1978 | Slagel | 137/119 |
| 4,538,640 | A | | 9/1985 | Acker | 137/596 |
| 4,681,140 | A | | 7/1987 | Hayman | 137/597 |

FOREIGN PATENT DOCUMENTS

| FR | 1548341 | 12/1968 |
| JP | 10141521 | 5/1998 |

OTHER PUBLICATIONS

International Search Report dated Sep. 10, 2000.

* cited by examiner

Primary Examiner—Stephen M. Hepperle
(74) Attorney, Agent, or Firm—Young & Basile, P.C.

(57) ABSTRACT

A selector valve arrangement (4 or 6) primarily for a shower bath unit comprises a radially directed and angularly movable flow directing ported valve member (40 or 60) within a valve chamber (41 or 61) having ports (45–48 or 63–65) with which porting (44 or 66) of the valve member (40 or 60) selectively communicates on appropriate rotational positioning of the valve member (40 or 60). The valve member (40 or 60) receives fluid (usually water) for distribution through a selected port or ports (45–48 or 63–65) from an on/off fluid flow control inlet valve (43 or 30). In one arrangement a spindle (42) for rotating the valve member (40) is also axially operable and releasably lockable (49, 50) for operating the on/off flow valve (43). In a further development an operating spindle has a co-axial hollow shaft (62) about it which can be releasably locked (70,73) to the spindle (32) and when they are so locked together the shaft (62) operates the ported valve member (60) with the on/off flow inlet valve such as a ceramic disc type valve (30) remaining inoperative i.e. during port selection. On release of the shaft (62) from the spindle (32) the latter can independently operate the on/off flow inlet valve (30) for admitting fluid flow to the ported valve member (60) and to the porting (66). The selector valve arrangement (4 or 6) may be received in a body (10) or body assembly (100) having passageways (15–17 or 113 and 114) for directing selected fluid flow to locations of use such as to shower heads or the like.

11 Claims, 12 Drawing Sheets

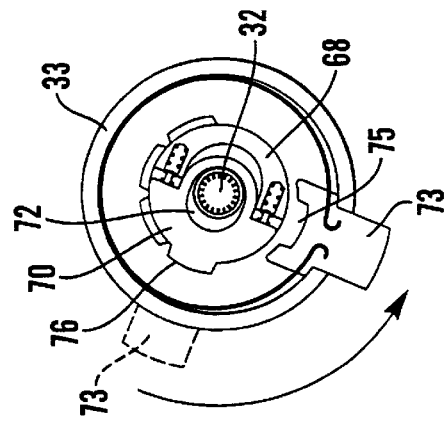
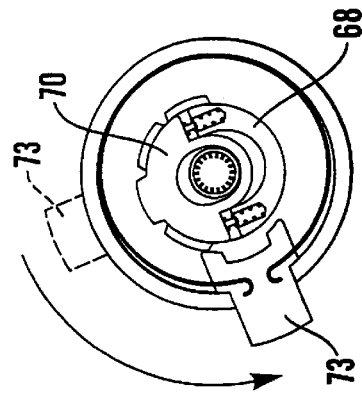
Fig. 14A
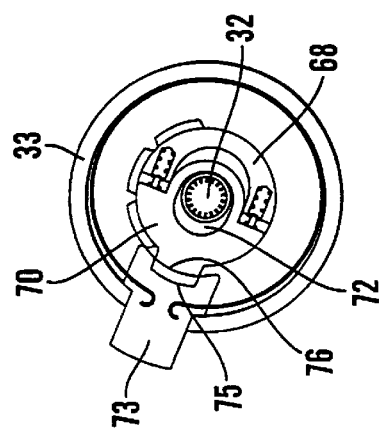
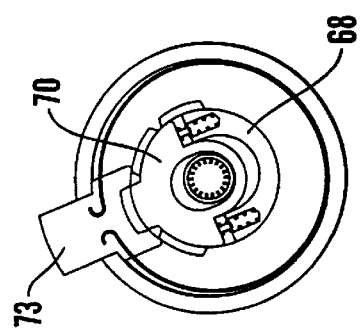
Fig. 14B
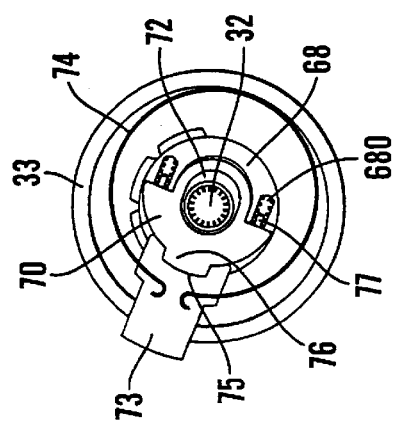
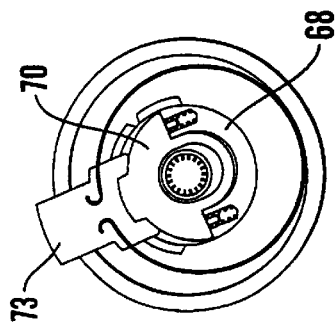

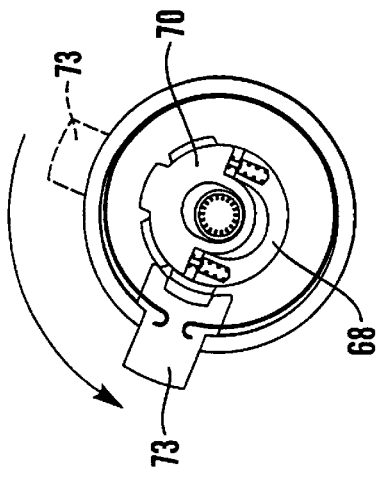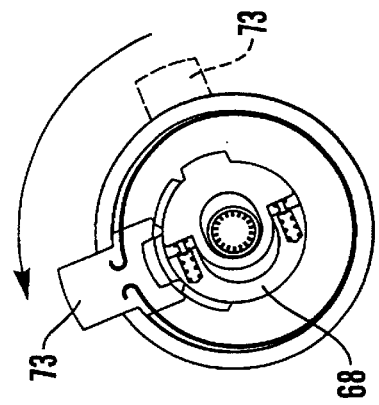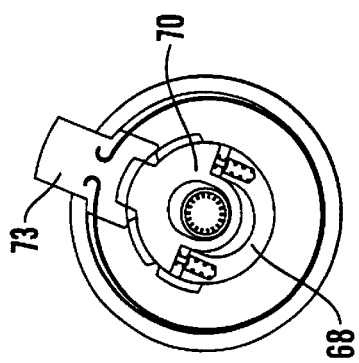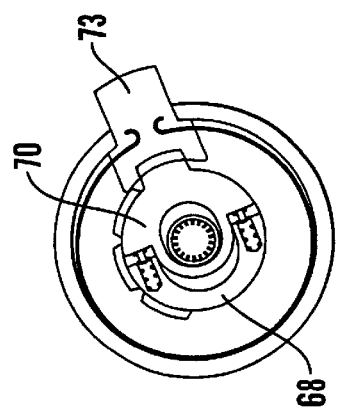
Fig.14C
Fig.14D
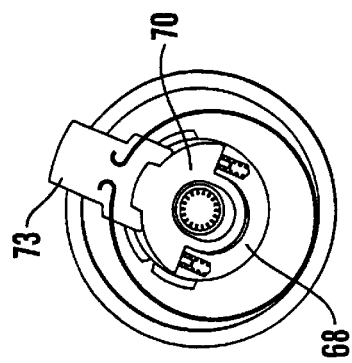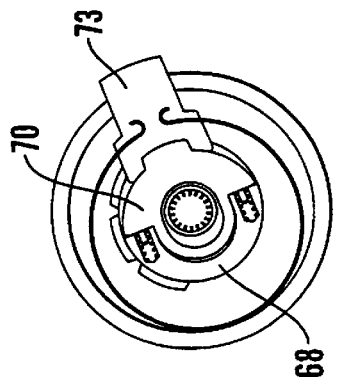

SELECTOR VALVE ARRANGEMENT

This invention relates to a valve arrangement for selectively controlling fluid flow more particularly, but not exclusively, for shower bath units providing multiple shower outlets or heads. Such outlets or heads are usually carried on or from a panel or tower which in use is wall mounted or similarly mounted in relation to a bath or within a shower cabinet or cubicle.

The object of the invention is to provide an improved selector valve arrangement for simply and effectively diverting or distributing fluid flow in one or more of various directions e.g. water flow to one or more shower outlets or heads.

According to the invention a selector valve arrangement for controlling fluid flow including a selector valve assembly having a ported valve member for receiving fluid flow therethrough and selectively movable into communication with outlet ports in a valve chamber for diverting or distributing fluid flow to one or more of the outlet ports for onward flow in a required direction or directions is characterised by the selector valve assembly having incorporated therewith or therein an on/off fluid flow control inlet valve to the ported valve member.

The selector valve arrangement may be wall or otherwise mounted in use and arranged for operation in conjunction with a thermostatic or manual fluid or water blending means for a required output temperature.

Practical examples of a selector valve arrangement in accordance with the invention are shown in the accompanying drawings in which.

Figure 1:
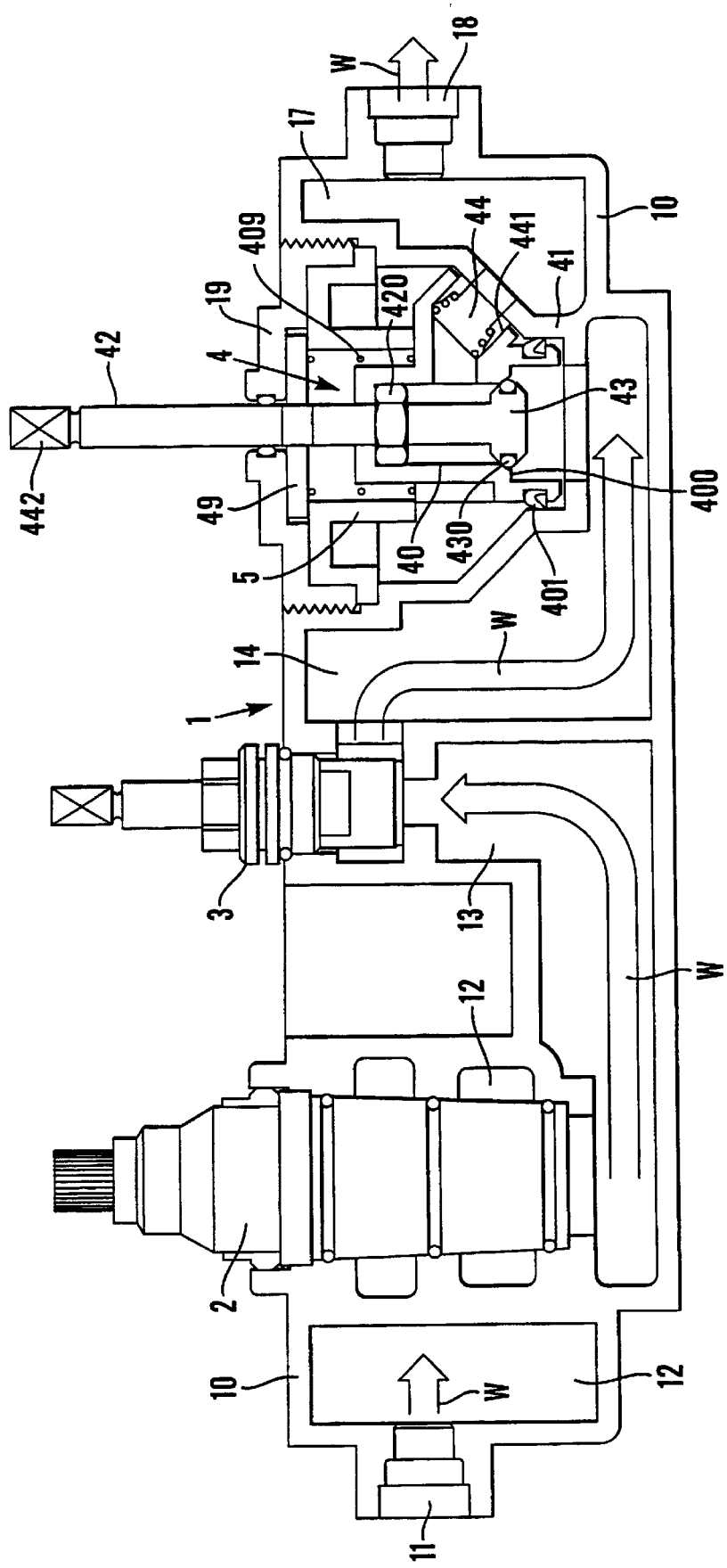
FIG. 1 is an axial plane cross sectional view of one form of complete valve assembly incorporating the selector valve arrangement.

In practice the complete valve assembly 1 as shown in FIG. 1 would usually be mounted or incorporated in a wall mounted panel or tower (not shown), the latter carrying a number of shower heads such as an overhead shower head, side heads or jets for showering the body of a person taking a shower and a shower hand set connected to the panel or direct to the valve assembly by a flexible hose.

The valve assembly 1 comprises a hollow compartmented body or manifold 10 having a water inlet 11 for admitting water flow W into compartment 12 and about an adjustable thermostat 2 for controlling heating of the water to a required temperature. Alternatively temperature control of heated water may be effected by means of a manual blender. The water flow W then passes via compartment 13 to an on/off valve 3 for controlling the water supply to the lower part of the selector valve 4 in compartment 14.

The selector valve 4 comprises a radially directed and angularly movable flow diverting valve member 40 within a ported chamber 41 and rotationally fast with an operating valve spindle 42 receiving a knob (not shown) at 442. The inner end of the valve spindle 42 carries an on/off inlet valve member or stopper plug 43 which in FIG. 1 is shown seated in a closed position against a seating 400 at the base or inner end of the valve member 40. A seal 401 is provided between the latter and the valve chamber 41.

Figure 2:
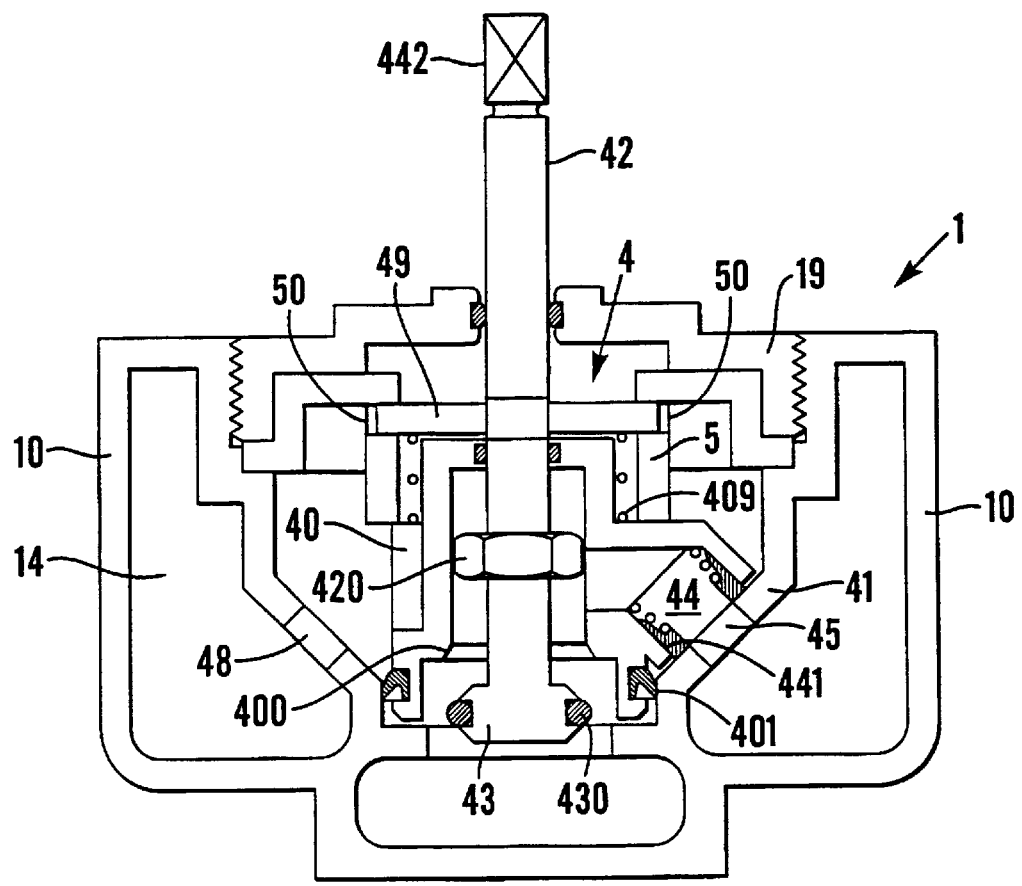
FIG. 2 is an axial plane cross section of the selector valve arrangement of FIG. 1 in the open condition and taken on a line through diametrically opposed ports of FIG. 4.
Figure 4:
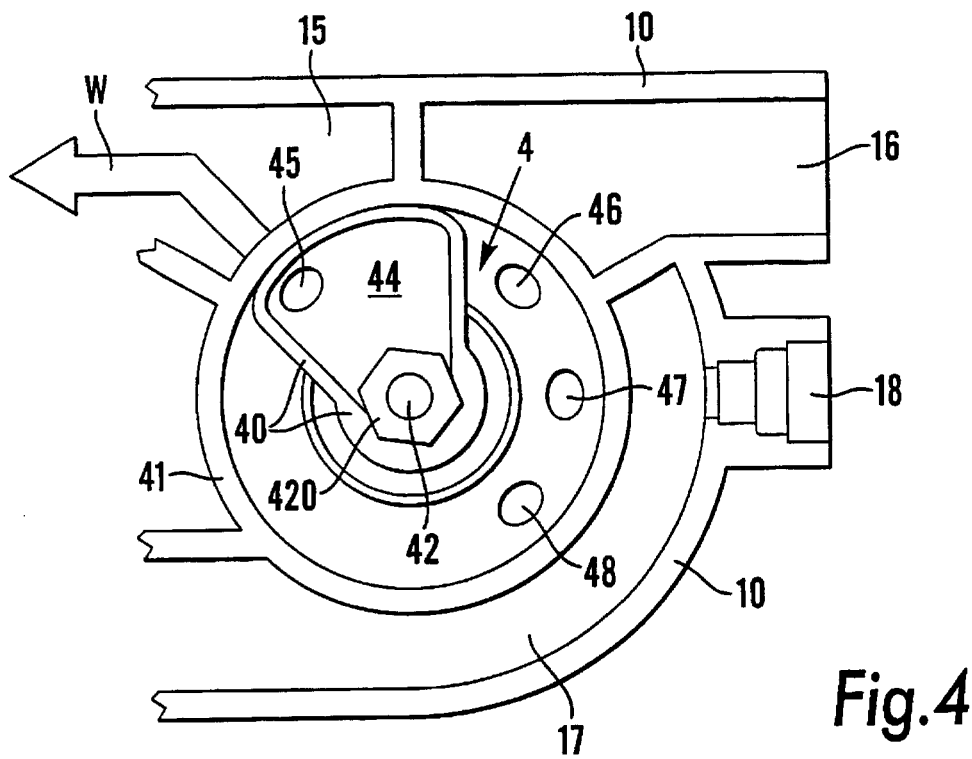
FIGS. 4 to 7 are cross sectional plan views each showing a different arrangement of selected fluid flow diversion or distribution.
Figure 5:
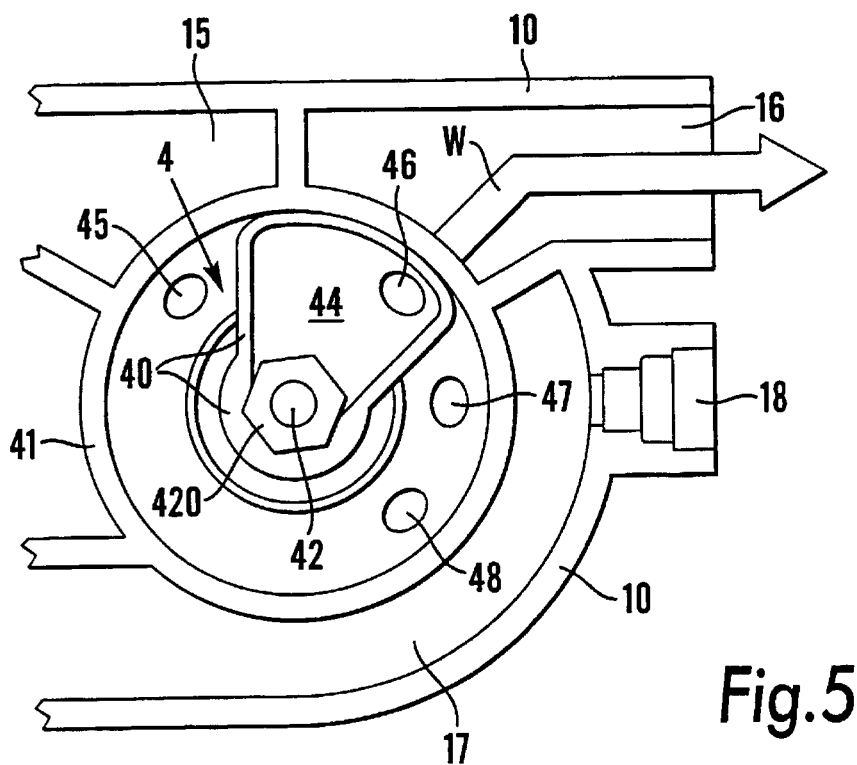
Figure 6:
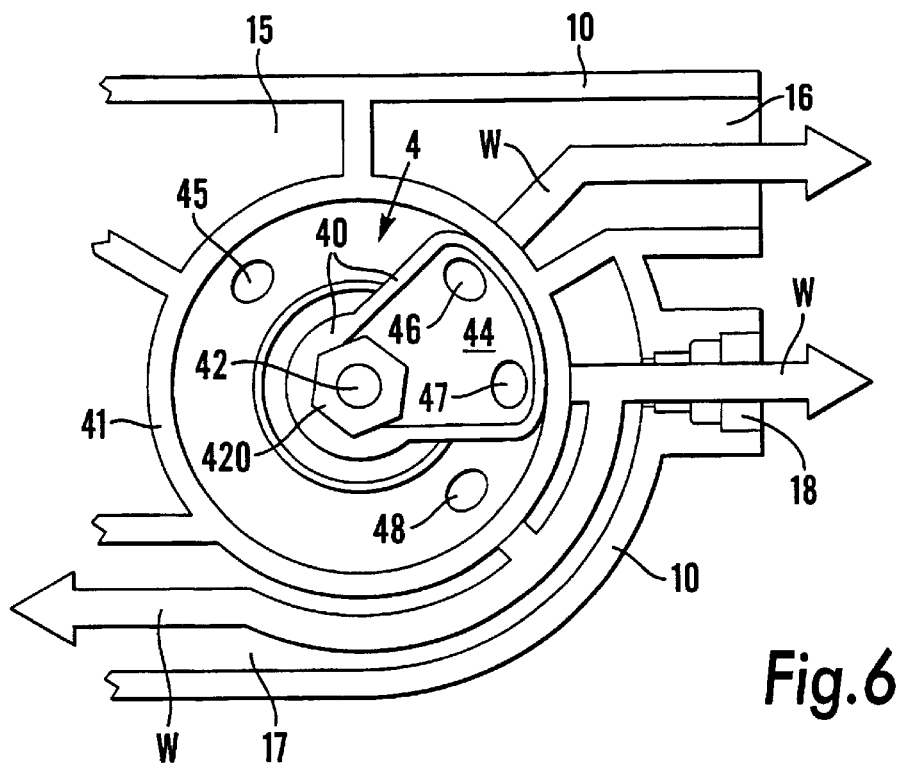

The inlet valve member or plug 43 which is provided with a sealing ring 430 serves to close off or admit water flow into the valve member 40 on operation of the latter and is operated to the open position by axially depressing the valve spindle 42 against spring loading 409 acting between a cross piece 49 on the spindle 42 and the valve member 40 (see FIG. 2). The plug 43 is urged to the closed position by the action of the spring 409 and also by water supply pressure acting directly on it.

On such axial movement of the valve spindle 42 it moves axially relative to the selector valve member 40 but it always has a rotary driving engagement with the latter i.e. by means of a nut shaped member 420 fast on the spindle 42 and slidable but non-rotatable within the central hollow interior of the valve member 40.

An open outlet port 44 of the valve member 40 is arranged to register with one or more outlet ports 45, 46, 47 and 48 of the valve chamber 41 and includes a spring loaded lip seal member 441 for fluidtight communication with a selected port or ports 45, 46, 47 or 48. These ports lie on a part circular path about the axis of the valve spindle 42.

Figure 3:
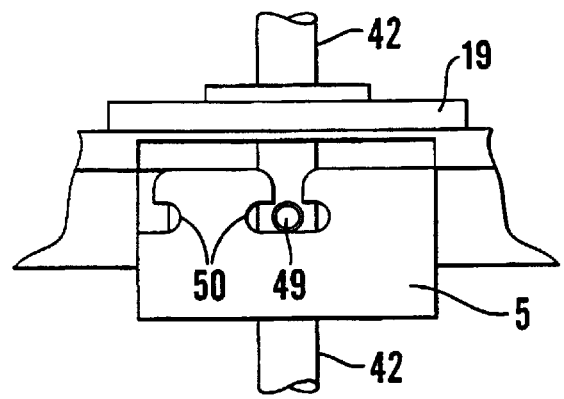
FIG. 3 is a detail view of valve spindle locating means.

As the spindle 42 is axially depressed to unseat the plug 43 and turned to a selected position it is locked in such position by locking means shown in the form of the radial projection or cross piece 49 carried by the spindle 42 and which engages any one of a series of notches or opposite notches 50 in a ring 5 surrounding the spindle 42 and fixed in the valve assembly body 10 by the valve retaining cap 19 (see FIG. 3). The notches 50 correspond to settings of the valve member 40 as referred to below.

A typical arrangement of selectively directing or diverting water flow W to required shower heads is shown in FIGS. 4 to 7.

Thus on depressing, turning and locking the valve spindle 42 to a first selected position or setting (FIG. 4), the plug 43 is unseated to admit water into the initially turned valve member 40 and from thence by its port 44 to port 45 in the valve chamber 41. From this port 45 it passes via a passageway 15 in the manifold body 10 to a shower handset for water outlet or spray use of the latter in the usual manner.

On further turning and locked selection of the valve member 40 to a second position (FIG. 5) the valve member 40 communicates with valve chamber port 46 for directing the water flow W via passageway 16 to an overhead shower head.

On still further turning and locking the valve member 40 at a third position (FIG. 6) the valve member 40 still communicates with the port 46 and also a further port 47 in the valve chamber 41 firstly for maintained water flow via the passageway 16 to the overhead shower head and also to a passageway 17 and an outlet 18 to shower heads or body jets usually carried in a fixed manner (apart from provision for any directional adjustment) on the panel or tower for showering the user's body. Where more than one water outlet is selected in this way it can be referred to as a "combination mode" of operation of the selector valve 4 or of the selector valve 6 as later described.

Figure 7:
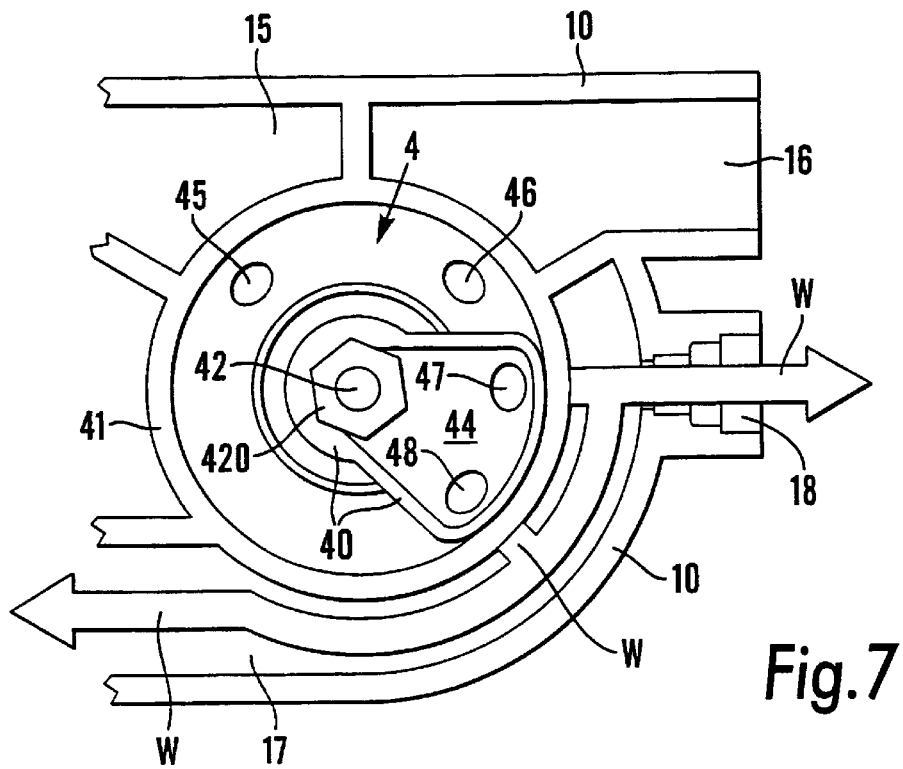

In a furthermost fourth angular setting of the valve spindle 42 as shown in FIG. 7, the valve member 40 communicates with the port 47 and a further port 48 for directing water flow to the passageway 17 and the outlet 18 to the shower head or body jets for operation only of the latter.

From a first or zero operational setting position of the valve member 40, typical relative angular positions of the valve member 40 for the further settings may be 45°, 90° and 135° but these angles may be varied according to requirements.

Whereas the valve member or plug 43 may solely serve as an on/off valve, in a further form of the selector valve arrangement according to this invention and as shown in FIGS. 8 to 14D, an on/off valve is incorporated in the selector valve 6 thus dispensing with a separate on/off valve 3 and also providing more advantageous operation of the selector valve 6.

Figure 8:
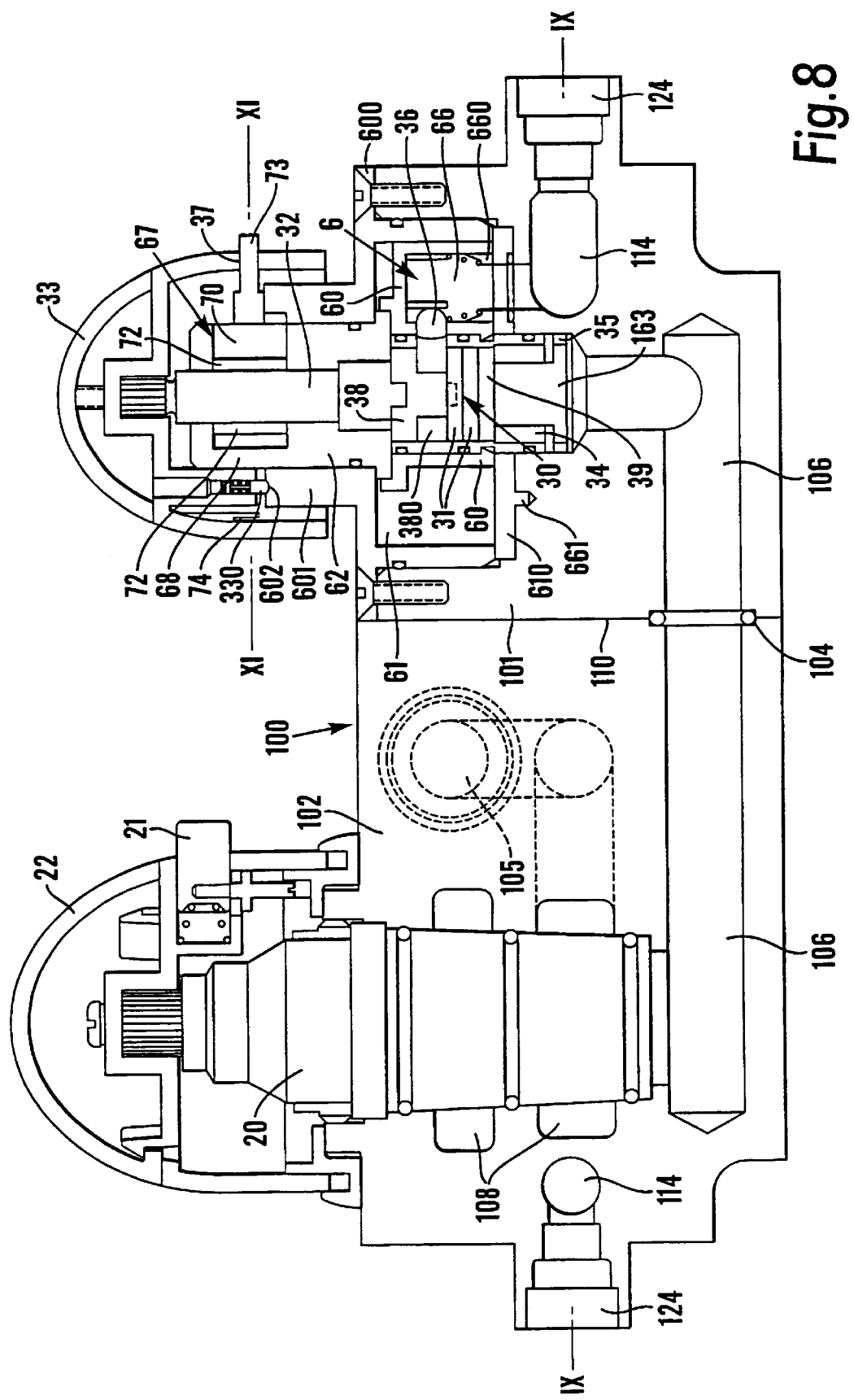
FIG. 8 is an axial plane cross section of a further form of valve assembly incorporating a developed form of on/off and selector valve arrangement.
Figure 9:
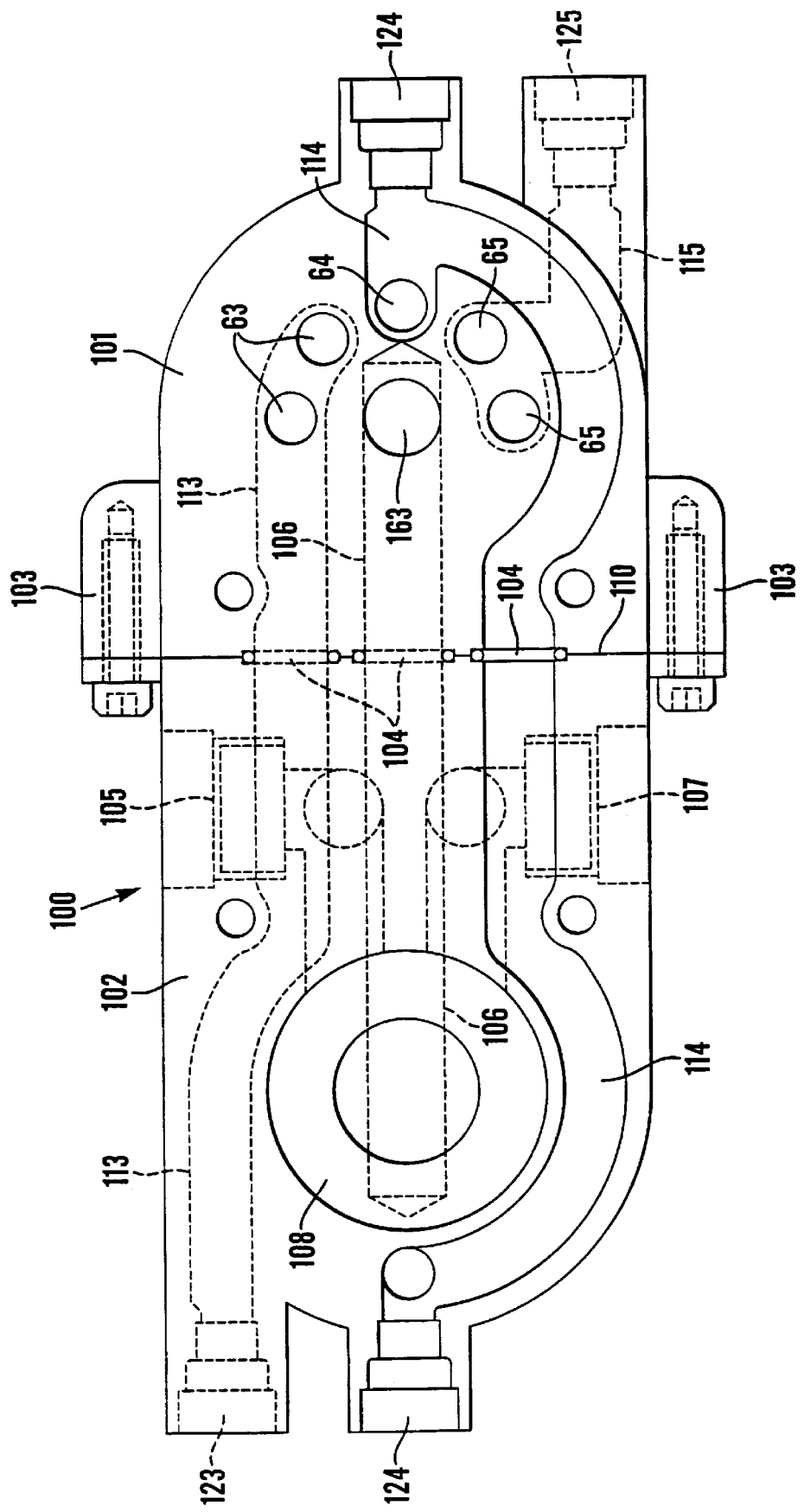
FIG. 9 is a cross sectional plan view taken on the line IX—IX of FIG. 8.
Figure 10:
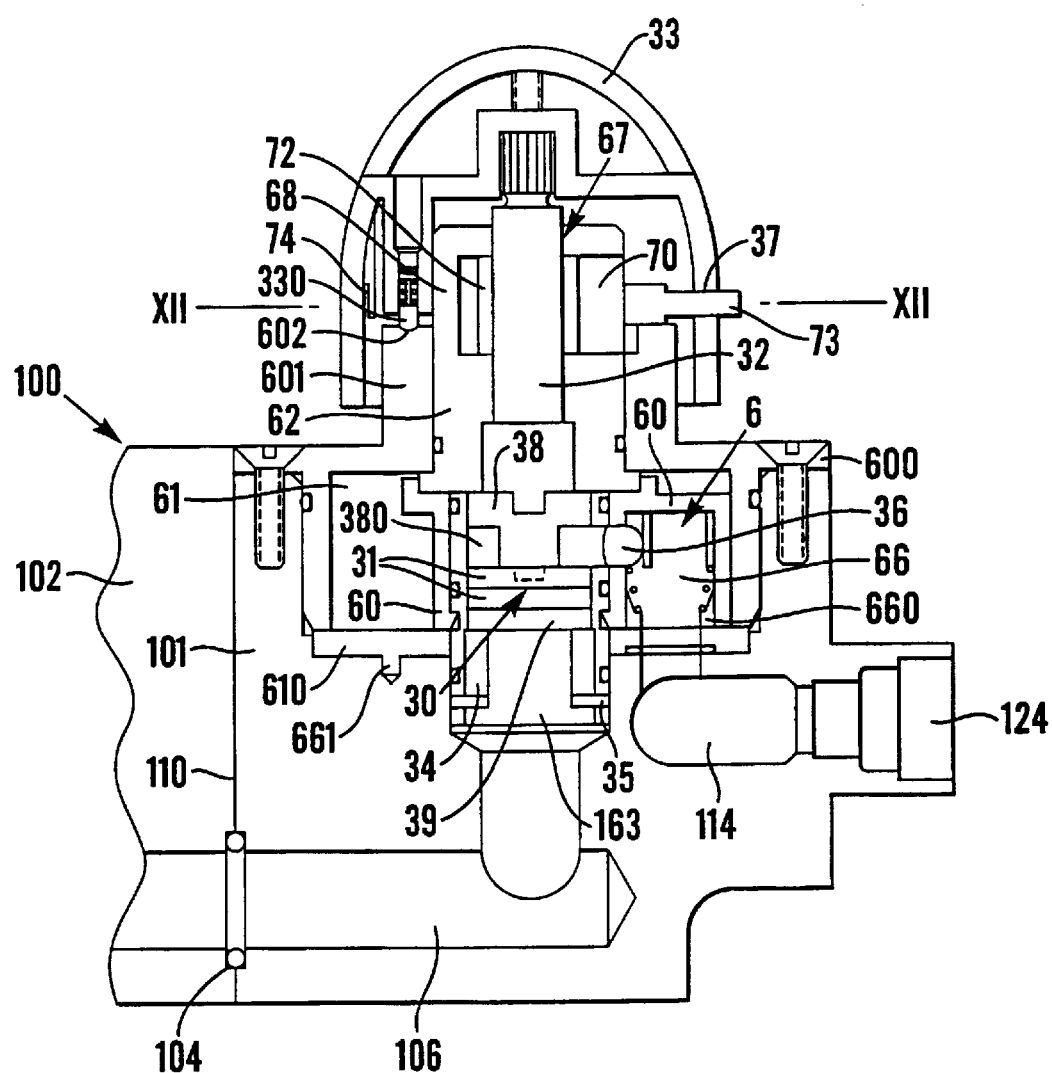
FIG. 10 is an axial plane cross section of the on/off and selector valve arrangement of FIG. 8, shown in a locked condition.
Figure 11:
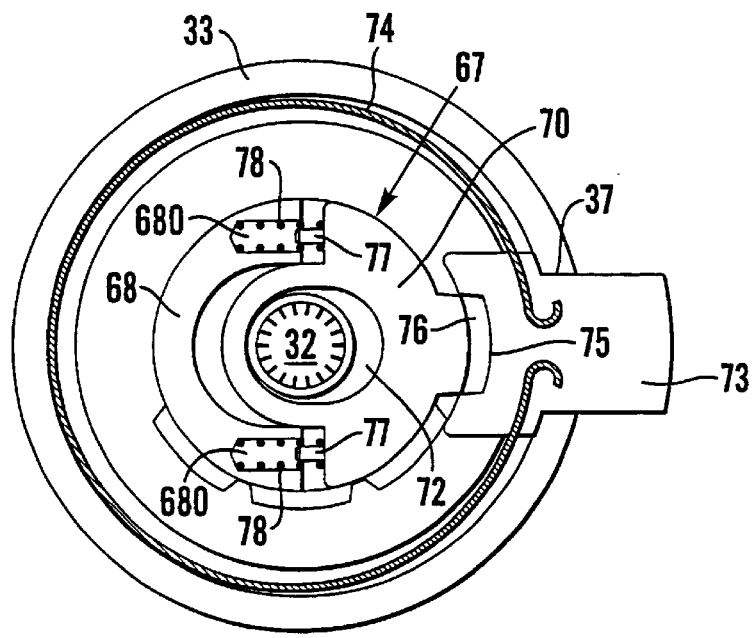
FIGS. 11 & 12 are detail cross sectional views of locking means respectively taken on lines XI—XI and XII—XII of FIGS. 8 and 10.
Figure 12:
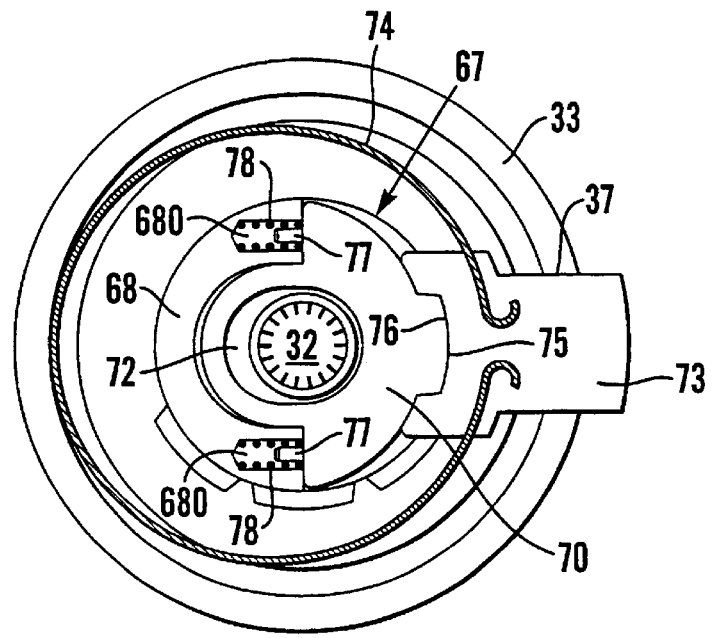
Figure 13A:
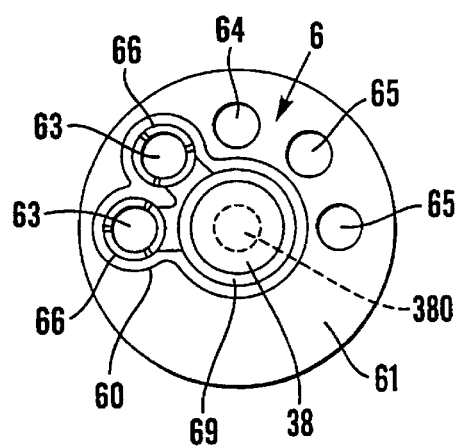
FIGS. 13A to 13D are diagrammatic plan views each showing a different selected position of the valve member in relation to outlet ports, and FIGS. 14A to 14D correspondingly show the operation and release of the locking means at each selected position of the valve member and also fluid flow control operation.
Figure 13A:
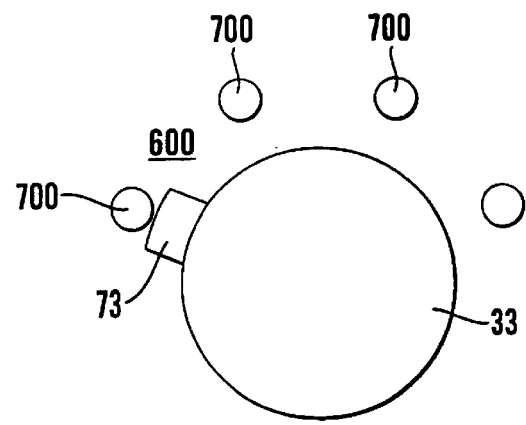
Figure 13B:
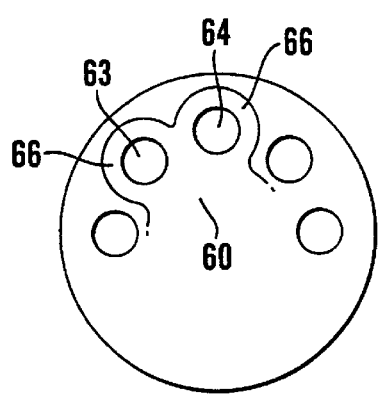
Figure 13B:
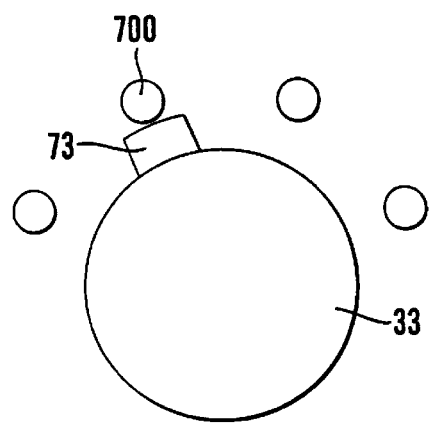
Figure 13C:
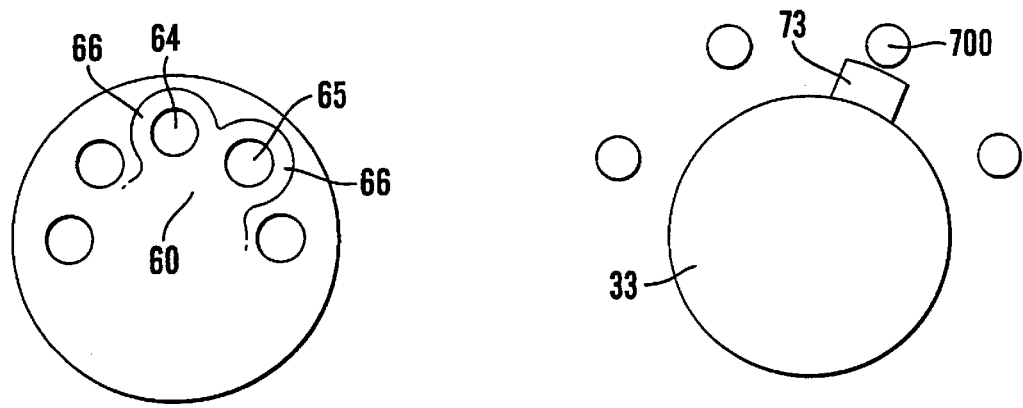
Figure 13D:
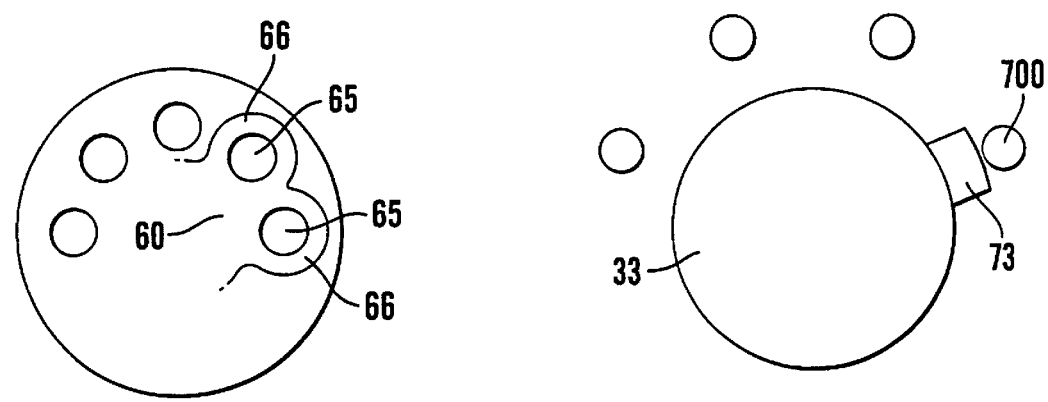

Referring firstly to FIGS. 8 and 9 a ducted manifold body or body assembly 100 receives the thermostat 20 in one body part 102 and the selector valve 6 in a further body part 101, the two body parts 101, 102 being secured together at adjacent faces 110 by screw connection 103 and in a fluidtight manner by the provision of sealing rings 104.

Hot and cold water side inlets 105, 107 communicate with annular spaces 108 about the thermostat 20 for regulation of the temperature of water passing therefrom to a lower water supply passageway 106 to the base of the selector valve 6. In the usual manner the thermostat 20 normally limits the water temperature to a maximum setting (e.g. 38° C.) but if a higher temperature is required a spring loaded button 21 on the knob 22 is depressed inwardly to permit the knob to be turned to a higher setting. Alternatively or additionally to the thermostat 20, the body part 100 may accommodate a manual water flow blender device for effecting temperature control.

The passageway 106 communicates with a lower inlet 163 to a flow control inlet valve 30 within the assembly of the selector valve 6, the control valve 30 being shown of the ceramic disc type in which a pair of apertured discs 31 are in highly finished face contact, one disc (i.e. the upper one) being driven by the valve spindle 32 to bring the apertures into and out of register for water flow control from the valve 30 to a port 36 through to the interior of a radially directed and angularly movable valve member 60 within a ported valve chamber 61 as later described. The lower inlet 163 receives a tubular distance piece 34 of rubber or other suitable resilient material retained by a circlip 35 and which serves to locate the valve 30 in position and maintain its discs 31 in intimate face contact on a support washer 39. An annularly recessed head 38 of the valve 30 provides a driving connection of the spindle 32 to the upper disc 31, the spindle 32 receiving a knob 33 rotationally fast with it such as by splined engagement as shown.

The selector valve member 60 is secured to a hollow shaft 62 for rotation therewith which shaft 62 is co-axially positioned about the spindle 32 for relative rotation of the latter except when they are locked together. In the unlocked condition the spindle 32 can be rotated by the knob 33 to operate the control valve 30 between a water flow shut off position and a full flow position and any rate of flow positions in between. Angular movement of the spindle 32 for this purpose may be through 90°.

Referring also to FIGS. 9 to 12 and for directional flow selection purposes and with the control valve 30 in the shut off position, the shaft 62 can be locked to the spindle 32 by a locking member 70 which is received in a transverse opening 67 in the upper part of the shaft 62, which opening 67 is closed at one end by a wall portion 68 of the shaft 62. An elongate hole or slot 72 in the locking member 70 freely surrounds the spindle 32 and permits a required extent of diametrical sliding movement of the locking member 70 relative to the spindle 32.

A push button 73 received by a slot 37 through the knob 33 is inwardly movable radially relative to the knob 33 against the action of spring loading shown provided by a spring ring 74 which urges the button 73 to an outward release position. On pushing the button 73 in, it has a driving engagement with the locking member 70 such as by a recess 75 at the inner end of the button 73 engaging a corresponding projection 76 on the locking member 70 or vice versa. At the same time a pair of projections or pins 77 on an inner part of the locking member 70 fully engage corresponding recesses 680 in the wall portion 68 of the shaft 62 (or vice versa) so that a positive driving engagement is provided between the locking member 70 and the shaft 62 and by the depressed button 73 with the knob 33.

In this way by turning the knob 33 in a required direction the spindle 32 and shaft 62 are turned with it and, in particular, the valve member 60 is also turned with the shaft 62 to the same angular extent. Thus the valve member 60 can be selectively turned for communication with outlet ports 63, 64 and 65 in the valve chamber 61. For this purpose the outer part of the valve member 60 is ported such as by a pair of ports 66 both communicating in common with a hollow interior 69 of the valve member 60 about the annular recess 386 in the head 38, (see FIG. 13A). Again the ports 63, 64 and 65 lie on a part circular path about the axis of the spindle 32 and the shaft 62.

During such selecting operation of the locked rotatable parts of the selector valve 6, the flow control valve 30 is simultaneously turned with the spindle 32 so that there is no relative movement between them and consequently the valve 30 is not operated and remains in its shut off condition. Having selected a required setting of the valve member 60, the push button 73 is released and becomes disengaged from the locking member 70. However, the latter remains located with the wall portion 68 of the shaft 62 by the pins 77 but is outwardly urged by the action of spring loading shown provided by compression springs 78 acting between the locking member 70 and wall portion 68, each spring 78 being located in a corresponding recess 680 and about the associated pin 77.

The knob 33 and spindle 32 can now be turned relative to the shaft 62 such as in the anti-clockwise direction shown (see FIGS. 14A to 14D) for opening the control valve 30 to allow water flow to pass into the valve member 60 and through selected ports of the outlet ports 63, 64 and 65. Before selecting another setting mode the knob 33 is turned back to the shut off position and then the button 73 is depressed to operate the locking member 70 for the above described locked turning operation of the spindle 32, shaft 62 and valve member 60. In this way water flow does not take place during setting mode selection in the interests of satisfactory operation for a person taking a shower.

In this example the valve chamber is provided with a pair of outlet ports 63, a single intermediate port 64 and a further pair of ports 65 and the two ports 66 of the valve member 60 are arranged to communicate with a pair of adjacent ports 63, 63 or 63, 64 or 64, 65 or 65, 65 at any one mode setting as respectively shown in FIGS. 13A to 13D. Corresponding push button 73 selection and release de-selection and also knob 33 turning movement for water flow is shown in FIGS. 14A to 14D.

Operative turning movement of the valve member 60 is shown in a clockwise direction and water flow turning movement of the knob 33 is shown in an anti-clockwise direction but any suitable turning directions may be employed.

On selection of both ports 63, 63 (FIG. 13A), water flow is directed to a communicating duct or passageway 113 in the body or manifold assembly 100 (see FIG. 9) solely to an outlet connection 123 for a shower head handset (not shown) connected to the outlet 123 by a flexible hose. Selection of ports 63, 64 (FIG. 13B) maintains water flow to the handset and also directs it via the port 64 to a duct 114 and outlet connections 124 to body shower heads or jets mounted on or from the panel in the manner previously referred to.

Further selection of ports 64, 65 (FIG. 13C) maintains water flow to the body jets and also directs it to an overhead shower head on the panel (or otherwise mounted) via the port 65 and then via a short duct 115 and outlet connection 125 to the overhead shower head. Furthermost selection of both ports 65, 65 (FIG. 13D) directs water flow solely to the overhead shower head.

As before the angular settings of the valve member 60 from an initial zero setting (as in FIG. 13A) may be at 45°, 90° and 135° as shown but, again, these angles may be varied according to requirements. Corresponding selection operation and release operation of the button 73 and also flow control operation of the knob 33 is shown in FIGS. 14A to 14D. The radial direction of the button 73 in FIGS. 8, 10, 11 and 12 is shown differently for clarity.

Referring back to FIGS. 13A to 13D and the right-hand series of diagrams, markers 700 or other suitable indications are preferably provided on a cap 600 or other support to assist in turning the knob 33 with depressed button 73 to the appropriate angular position for a required shower mode selection. The cap 600 serves to secure the valve assembly 6 in the body part 101 of the manifold body assembly 100. "Click" location of the knob 33 for tactile recognition of each mode selection may be provided as later described.

For satisfactory fluidtight operation of the valve member 60 in relation to the ports 63, 64 and 65 the latter are provided through a plate 610 at the bottom of the valve chamber 61 and located therein at 661, the plate 610 having a highly finished smooth upper surface for cooperation with spring loaded lip seals 660 in the ports 66 of the valve member 60. As will be appreciated the ports 63, 64 and 65 communicate through the plate 610 with respective ducts 113, 114 and 115 in the manifold assembly 100.

To assist the user, the position of the knob 33 at any of its angular mode selection settings, i.e. as per FIGS. 13A to 13D and 14A to 14D, may be indicated by "click" action location of each setting. This is shown provided in FIGS. 8 and 10 by a spring loaded plunger 330 carried by the knob 33 and engaging one or the other of angularly spaced apart recesses 602 on a fixed part of the valve assembly viz: on the end of an upstanding part or collar 601 of the cap 600. Alternatively the plunger may be carried by the collar 601 and cooperate with recesses within the knob 33.

In the case of either of the above described selector valve arrangements, the selection or sequence of selected operation of communicating ports and the number or combination of selected shower heads at any one setting may be varied to meet operational requirements.

Whereas the selector valve arrangements have been described in relation to their upright positions as principally shown in the drawings, it will be appreciated that they may be installed in any required position of use.

Various modifications may be made to the selector valve arrangements and valve assemblies within the scope of the invention herein defined. It is also to be understood that the selector valve arrangement may be used or combined with other shower or fluid flow control devices.

What is claimed is:

1. A selector valve arrangement for controlling fluid flow comprising a selector valve assembly having a ported valve member for receiving fluid flow there through and selectively movable into communication with outlet ports in a valve chamber for diverting or distributing fluid flow to one or more of the outlet ports for onward flow in a required direction or directions, the selector valve assembly having incorporated therein an on/off fluid flow control inlet valve to the ported valve member, the on/off fluid flow control inlet valve comprising a valve member or plug which is axially operated by the operating member or spindle and cooperates with a seating at an inlet to the ported valve member for on/off inlet fluid flow control to the latter and wherein the operating member or spindle is axially movable to operate the valve member or plug, releaseable locking means being provided for locking the operating member or spindle and the valve member or plug in the open condition of the latter.

2. A selector valve arrangement according to claim 1 wherein the releasable locking means is arranged to lock the operating member or spindle and the valve member or plug in the open condition of the latter at each selected position of the ported valve member.

3. A selector valve arrangement according to claim 1 wherein the porting of the ported valve member is such that at least one selected position of the ported valve member communicates with more than one of the outlet ports of the valve chamber.

4. A selector valve arrangement according to claim 1 wherein the selector valve is received in a body member or body assembly containing passageways communicating with corresponding outlet ports of the valve chamber and further communicating with outlets from the body member or body assembly for fluid flow direction to required locations of use such as to shower heads or the like.

5. A selector valve arrangement for controlling fluid flow comprising a selector valve assembly having a ported valve member for receiving fluid flow there through and selectively movable into communication with outlet ports in a valve chamber for diverting or distributing fluid flow to one or more of the outlet ports for onward flow in a required direction or directions, the selector valve assembly having incorporated therein an on/off fluid flow control inlet valve to the ported valve member, the ported valve member being operated directly or indirectly by an operating member or spindle which is also arranged to operate the on/off fluid flow control inlet valve, wherein the on/off fluid flow control inlet valve comprises a disc type valve located within the selector valve assembly of the selector valve arrangement and is operable by the operating member or spindle for on/off fluid flow control into the ported valve member and to and through the porting of the latter.

6. A selector valve arrangement according to claim 5 wherein a hollow shaft coaxially disposed about the operating spindle and adapted to be releasably locked to the spindle whereby when they are so locked together the hollow shaft rotatably operates the ported valve member when the spindle is turned whilst the on/off fluid flow control inlet valve remains inoperative i.e. during port selection and whereby, on release of the hollow shaft from the spindle when the ported valve member is at a required selected position, the spindle can be independently turned to operate the on/off fluid flow control inlet valve for admitting fluid flow into the ported valve member and to and through the porting of the latter.

7. A selector valve arrangement according to claim 6 wherein the hollow shaft and spindle are releasably locked together by an externally operated locking member.

8. A selector valve arrangement according to claim 7 wherein the locking member is arranged to be externally operated by an operating member or push button carried by the spindle such as by an operating knob thereon.

9. A selector valve arrangement according to claim 8 wherein the operating member or push button has a releasable engagement with the locking member.

10. A selector valve arrangement according to claim 5, wherein the porting of the ported valve member is such that at least one selected position of the ported valve member communicates with more than one of the outlet ports of the valve chamber.

11. A selector valve arrangement according to claim 5 wherein the selector valve received in a body member or body assembly containing passageways communicating with corresponding outlet ports of the valve chamber and further communicating with outlets from the body member or body assembly for fluid flow direction to required locations of use such as shower heads or the like.

* * * * *